(12) United States Patent
Peter

(10) Patent No.: US 6,902,312 B2
(45) Date of Patent: Jun. 7, 2005

(54) METHOD OF PRODUCING RUBBER MIXTURES

(75) Inventor: Julius Peter, Dommayergasse 7/13, Vienna (AT)

(73) Assignees: Continental Aktiengesellschaft (DE); Julius Peter (DE)

( * ) Notice: Subject to any disclaimer, the term of this patent is extended or adjusted under 35 U.S.C. 154(b) by 132 days.

(21) Appl. No.: 10/619,221

(22) Filed: Jul. 14, 2003

(65) Prior Publication Data

US 2004/0125687 A1 Jul. 1, 2004

(30) Foreign Application Priority Data

Jul. 12, 2002 (DE) .......................................... 102 31 524
Nov. 2, 2002 (DE) .......................................... 102 51 032

(51) Int. Cl.⁷ ............................... B29B 7/48; B29B 7/74
(52) U.S. Cl. ......................... 366/69; 366/76.7; 366/77; 366/91; 366/97
(58) Field of Search ............................... 366/76.7, 76.8, 366/76.93, 75, 77, 91, 96, 97, 98, 99; 425/205

(56) References Cited

U.S. PATENT DOCUMENTS

| | | | | |
|---|---|---|---|---|
| 3,951,389 A | * | 4/1976 | Porter ........................... | 366/91 |
| 4,455,091 A | * | 6/1984 | Bamberger et al. ......... | 366/76.7 |
| 5,011,291 A | * | 4/1991 | Peter ............................ | 366/91 |
| 5,108,188 A | * | 4/1992 | Peter et al. .................... | 366/91 |
| 5,183,640 A | * | 2/1993 | Peter et al. .................... | 366/91 |
| 5,251,977 A | * | 10/1993 | Peter et al. .................... | 366/91 |
| 5,324,107 A | * | 6/1994 | Tanaka et al. ............. | 366/76.3 |
| 5,368,383 A | * | 11/1994 | Peter et al. .................... | 366/97 |
| 5,496,107 A | * | 3/1996 | Peter ............................ | 366/91 |
| 5,865,535 A | * | 2/1999 | Edwards .................... | 366/76.7 |

FOREIGN PATENT DOCUMENTS

| | | |
|---|---|---|
| DE | 3702833 | 8/1988 |
| DE | 4027261 | 12/1991 |
| EP | 0472931 | 3/1992 |
| EP | 0837095 | 4/1998 |

\* cited by examiner

*Primary Examiner*—Tony G. Soohoo
(74) *Attorney, Agent, or Firm*—Robert W. Becker & Associates; Robert W. Becker

(57) ABSTRACT

A method for the production of rubber mixtures in a ram kneader or in an aggregate combination of a ram kneader and a preferably thereunder disposed ram-less kneader includes applying a fluid in a surface covering application onto the mixture which has been handled in the ram kneader at the same time as during the mixing process at which there occurs at least one of an enlargement of its working volume, during the discharge process in which the mixture is discharged from the ram kneader, and during a time at which the mixture is in the ram-less kneader, the boiling point of the fluid being less than the desired end temperature of the mixture and the fluid being evaporated during the course of further working of the mixture in a manner in which no fluid remnants remain.

18 Claims, 1 Drawing Sheet

METHOD OF PRODUCING RUBBER MIXTURES

BACKGROUND OF THE INVENTION

The present invention relates to a method for the production of rubber mixtures in a ram kneader or in an aggregate combination comprised of a ram kneader and a ram-less kneader disposed, preferably, underneath the ram kneader.

In connection with the production of rubber mixtures, one tries to achieve the lowest possible mixing temperature: as regards base mixtures or master batches, because of the distribution of fillers; as regards final mixtures, because of the reduced danger of premature vulcanization; and, as regards heat sensitive polymers such as, for example, natural rubber, to avoid damage of the polymer chains caused by the higher temperatures.

For decades, it has been an objective of the machine and process developments to achieve reduction of the mixing temperature via, for example, the development of kneaders with rotors which mesh with one another and the development of HESC rotors (high efficiency, super cooling rotors), via different positions of the cooling channels in the kneader pans or troughs, via the deployment of reduced revolutions per minute, and via many other measures.

These so-developed processes, however, have been directed to indirect cooling by which the pan or trough encircling the kneader, or the rotor, is cooled via water circulating in cooling channels and by which, accordingly, the heat occurring because of the mixing is conducted away. The water circulating in the cooling channels has no contact with the mix. If cracks occur in the kneader, the kneader must be shut off and repaired.

A basic disadvantage of the process of indirect cooling via circulating water in pans or troughs or in the rotors is that the heat conducting capability and the heat conducting capacities of the metal coatings in the pan or trough or, respectively, in the rotors, come into play, whereby it is known that, in particular in connection with highly wear resistant metal coatings, there exists only a poor heat conducting capability.

This leads to the result that the temperatures of the mixture and the metal masses have a counter-cyclic relationship—that is, in connection with the required cooling process, initially the metal masses of the kneader must be cooled during the mixing process before a meaningful cooling of the mixing components sets in. The production of rubber mixtures in one mixing step ("one step process") is, in spite of many other advantages such as, for example, reduced space requirements, typically limited to small kneaders and/or plastic, slow vulcanizing mixtures and, as regards an adequate (online) cooling during the mix process, is often associated with long total mixing times.

In order to ensure the production of rubber mixtures having a sufficiently low mixing temperature, 80 to 90% of the total globally produced mixings, especially in large kneader tire mixings, have heretofore been produced via two step processes or greater than two step processes, whereby it has, as required, been necessary to discharge the mixings out of the kneader after each mixing step, form the intermediate mix product into a sheet via a rolling mill or a discharge extruder, cool off the sheet and, thereafter, perform one or more subsequent mixing processes. This manner of production is associated with high cost and time demands and is, for these reasons, uneconomical.

From EP 0 472 931 A1 and DE 37 02 833 A1, it is known to produce a rubber mixture in an aggregate combination comprised of a ram kneader and a ram-less kneader arranged under the ram kneader, whereby, especially in connection with the deployment of ram-less kneaders with meshing rotors, it is possible to cool the mixture product before the addition of further components thereto and, thus, to prepare in final form the mixture product during a build up cycle. Since the ram-less kneader is typically driven at low rates of rotation, it is possible to reduce the counter-cyclic temperature path between the kneader and the mixture, whereby the desired cooling of the mixture has already been effected at an earlier time and the cooling of the mixture is accelerated.

However, in connection as well with this process, especially in connection with the production of very hot running mixtures or in connection with mixtures which require only a very short mixing time, it is desirable to have a reinforcement or improvement of the cooling properties.

Any consideration of directly adding water to the rubber mixture for the cooling purposes runs into the reality that the rubber mixtures are almost exclusively composed of hydrophobic mixing components (rubber, paraffin softener, carbon black, paraffin wax, etc.) while water is hydrophilic.

EP 0 837 095 A1 discloses a method for the production of a silica-containing rubber mixture in which an improved distribution of the silica filler and good vulcanization properties can be achieved via mixing of the mixtures in accordance with completely predetermined temperature profiles. The coupling of the silica to the silane-coupling agent should be achieved at temperatures from 130 to 140° C. The temperature control can be effected via control of the rotational speed of the rotors or via the introduction of water directly into the mixture. The water is, in the latter instance, worked into the mixture. However, in this system, as well, in spite of the fact that a partially hydrophobic element is introduced into the mixture via the silica, there occurs an adhesion to mixtures having a basic lack of water, in that, for example, included water remnants remain in the mixture which, during subsequent working of the mixture such as, for example, during vulcanization, can lead to non-uniformities in the product.

SUMMARY OF THE INVENTION

The invention provides a solution to the challenge of providing a mixing process which improves the above-noted type of cooling of the mixture.

The given challenge is solved in an inventive manner in that a fluid or liquid is applied in a surface covering application onto the mixture which has been handled in the ram kneader at the same time during the mixing process at which there occurs an enlargement of the ram working volume and/or during the discharge process and/or, in connection with the added availability of a ram-less kneader (an aggregate combination), a fluid is applied in a surface covering application onto the mixture which has been transferred over to the ram-less kneader during the course of the mixing process, the boiling point of the fluid being less than the desired end temperature of the mixture and the fluid being evaporated during the course of further working of the mixture in a manner by which no fluid remnants remain.

The steam heat content of the applied fluid which is, in particular, a cold fluid, is exploited for direct cooling of the mixture. The fluid evaporates on the hot surface coverings of the rubber mixture and does not leave behind any remnants in the mixture. The moisture content of the mixture is unchanged before and after the cooling process. In this connection, it is important that the fluid is applied onto the mixture in a surface covering application manner and is not somehow worked into the mixture, as only an application of a fluid in a surface covering manner can lead to remnant free—i.e., complete—evaporation of the fluid and can be an effective cooling mechanism. No included fluid remnants remain in the mixture which, during subsequent working of the mixture such as, for example, during vulcanization, would otherwise lead to non-uniformities in the product.

It is worth noting that, because the fluid serving to cool the mixing component is applied in a surface covering manner, the available work volume of the ram kneader is not reduced.

The inventive method is particularly effective when deployed in aggregate combinations of a ram kneader and a preferably thereunder disposed ram-less kneader and it is particularly preferred to effect such deployment of the inventive method in connection with the discharge process of the ram kneader and/or within the ram-less kneader, as the ram-less kneader typically mixes at lower temperatures and, for this reason, a particularly effective cooling can be achieved thereat.

The enlargement of the working volume of the ram kneader can be effected via clearance movement of the ram and/or enlargement of the spacing of the axles of the rotors during the mixing and/or via opening of the discharge flap. Apparatus which permit an enlargement of the spacing of the axles of the rotors are conventionally known as is evidenced, for example, by EP 0 230 333 A2.

In accordance with one aspect of the present invention, the given challenge is solved by an inventive method for the production of a rubber mixture in an aggregate combination comprised of a ram kneader and a preferably thereunder arranged ram-less kneader, in which the inner metal surfaces of the ram-less kneader are cooled before or during the transfer over of the mixing product from the ram kneader into the ram-less kneader via the application of fluid and/or the application of air, preferably dry air, onto such surfaces, whereby the fluid evaporates during the course of further working of the mixture in a manner by which no fluid remnants remain.

In view of the fact that the ram-less kneader is an open system, the gas or vapor which occurs during the evaporation of the fluid can, advantageously, escape in a manner by which no fluid remnants remain. The inner metal surfaces of the kneader—that is, the kneader walls and the rotor—are directly cooled from the inside by a fluid and/or air and the cooled inner metal surfaces then effect a cooling of the mixture which has been transferred over to the ram-less kneader. This process can be performed in a particularly economical manner in aggregate combinations of a ram kneader and a ram-less kneader, in that, contemporaneous with the cooling of the ram-less kneader, the mixture can be mixed in the ram kneader. The applied fluid converts in part to vapor by contact with the hot metal walls. The non-evaporated portion of the fluid can be discharged via the discharge opening. It is, however, preferred that the fluid remnants remain after their application on the surfaces on the metal surfaces of the ram-less kneader. These remnants are evaporated, at the latest during the course of the further mixing work, via the enthalpy of the mixture which has been emptied from the ram kneader into the ram-less kneader and thus such remnants contribute in this manner to further effective cooling of the mixture.

The fluid can be applied via injection and/or spraying in order to achieve the maximum possible uniform fine distribution of the fluid onto the surface coverings of the rubber mixture or, respectively, onto the inner metal surfaces. To this end, injection nozzles can be installed in the kneader wall and/or spray nozzles can be installed above the ram-less kneader.

It has been shown to be of advantage if the evaporation of the fluid which has been applied onto the mixture components or the inner metal surfaces is accelerated by an air stream, especially an air stream introduced via a fan or a ventilator.

In dependence upon the respective applied fluid and the desired end temperature of the mixture, the cooling process can be accelerated or made possible by a reduction of the boiling point of the applied fluid via evacuation. The cooling off can, for example, be reinforced in an advantageous manner in that—as described, for example, in the application DE 40 27 261 C1—an evacuation is effected via compartmentalization or bulkheading of the intermediate space between the discharge opening of the ram kneader and the fill opening of the ram-less kneader and the creation of a vacuum.

In order to realize a sufficient cooling of the mixture component, it has been found to be of advantage if fluid in the amount of 5 to 20 parts by weight of fluid per 100 parts by weight of the mixture is applied onto the mixture product or the inner metal surfaces.

The fluid can be applied in one or several portions onto the mixture components or onto the inner metal surfaces.

The application of fluid in the mix process in accordance with the present invention offers, as well, the possibility to add in, with the assistance of fluid, rubber additives including, in particular, reactive additives, in the form of an emulsion or suspension in the mixture product. This approach leads to a uniform distribution of the additives, such as, for example, fillers or cross-linking chemicals, in the rubber mixture. Temperature peaks within the mixture and a premature reaction are avoided due to the cooling effect of the fluid.

In order to optimize the working of the rubber mixtures, to effect the cross-linking of the rubber mixtures, and to improve the adherence of the rubber mixtures, reactive additives are introduced to the rubber and/or to the rubber mixtures. These reactive additives influence the plasticity of the rubber mixtures, the cross-linking velocity of the mixtures, the degree of cross-linking, the properties of the vulcanization component as well as the adherence of the rubber mixtures to various materials (for example, textile reinforcement supports, steel, other metals, synthetic materials, and so forth) and the connection of the rubber molecules to the fillers such as, for example, to the silica.

The reactive additives undergo chemical reactions whose reaction speeds follow the rules of chemical reaction kinetics—that is, the reaction velocity approximately doubles in connection with a temperature increase of 10° K. For this reason, the upper value of the temperature as well as a uniform temperature distribution within the mixture play important roles in connection with the working of the mixtures with reactive additives. In connection with the production of mixtures via rolling mills, as was the practice earlier, the mixtures exhibited a lower temperature and a relatively uniform temperature distribution while with today's almost exclusively deployed kneaders (inner mixers), the rubber mixtures are mixed in a hotter and non-homogeneous manner.

Within the kneaders, the maximum energy input occurs between the active edges of the rotors and the kneader wall, whereupon the rubber or, respectively, the rubber mixture, is heated in a non-homogeneous manner. One result of this is that the additives are preferably mixed in at the respective location at which the rubber or the rubber mixture has already become its softest and most receptive to incorporating such additives. The higher the temperature, the more non-homogeneous the temperature distribution and the more non-uniform the distribution of the local concentrations of the reactive additives, whereupon the danger is correspondingly greater that the reactive additives such as, for example, cross-linking, decomposition, and/or adherence materials, will have already prematurely reacted (scorched) before the uniform distribution of the materials can even have begun.

As the additives in ram kneaders can only be introduced therein when there has been a clearance movement of the ram, the danger of local over-concentrations in these mixture types increases. The danger further increases if, to improve the manipulability and/or to reduce the dirt loading, the reactive additives are—as is common these days—added in a packaged manner in the form of polyethylene leaves. In this event, the polyethylene must first be melted before the substances can be distributed.

In connection with a ram-less kneader, the additives, to the extent that these are introduced under a ram kneader, as is typical with respect to, for example, a tandem arrangement, can be delivered via a gravity conduit. In this event, however, the danger exists of blockages in the gravity conduit.

All of the heretofore noted disadvantages in connection with the introduction of, in particular, reactive additives, can be resisted, in accordance with the inventive method, by introducing the additives including, in particular, the reactive additives, into the mixture via emulsification or suspension in the (cooling) fluid. The emulsions or suspensions can be applied via injection or spraying thereof onto the mixture in the kneader, whereby it is particularly preferable if the reactive additives are introduced as an emulsion or a suspension in the ram-less kneader, as the temperatures of the mixture in the ram-less kneader are commonly not so high.

The fluid works, upon the introduction thereof onto or, respectively, into, the rubber mixture, as a cooling medium and, as it is evaporated at, preferably, the hottest location of the kneader, as a thermostat. The mixture, moreover, disintegrates or disassociates in the kneader upon the introduction of fluid (emulsion, suspension) into small mixture clumps on whose surfaces the reactive additives then are pre-distributed in a large surface application and, after the evaporation of the fluid, can be uniformly and well-mixed into the mixture.

The additives are preferably emulsified or suspended in a fluid volume which comprises between 0.1 to 10% of the volume of the mixture.

Various fluids can be used as the fluid for cooling and, as the occasion arises, as fluids having emulsions or suspensions. Particularly preferred, to be sure, are water and ethanol. These substances are available in relatively large quantities, have a low boiling point, and should not, from the point of view of pollution impact and the possibility of easy regeneration, be regarded as objectionable. If water is used as the fluid, it has been shown to be of advantage if the water is introduced at a temperature of 70 to 90° C. onto the mixture. The water can, in this manner, be more rapidly evaporated and the heat of vaporization effectively cools off the mixture.

In one preferred embodiment of the invention, at least one wetting agent is added to the water which is to be introduced as the cooling medium. The wetting agent reduces the surface covering tension and is in the position to moisten the surfaces in a substantially complete and laminar manner, whereby the cooling off effect is further improved.

Anions, cations and non-ionic linking mediums are suitable as wetting agents. The one or several wetting agents are added to the water to be deployed as the cooling medium in concentrations of between 0.01 to 5% by weight, and preferably, from 0.2 to 1% by weight. In this connection, it is further advantageous to use wetting agents which minimize or delay the formation of lime deposits.

The invention is now described with reference to an embodiment of the present invention.

BRIEF DESCRIPTION OF THE DRAWINGS

The sole FIGURE of the drawing is a vertical sectional view of one inventive variation of an apparatus comprising a ram kneader and a ram-less kneader for the production of rubber mixtures in accordance with the method of the present invention.

DETAILED DESCRIPTION OF THE PREFERRED EMBODIMENT

Figure 1:
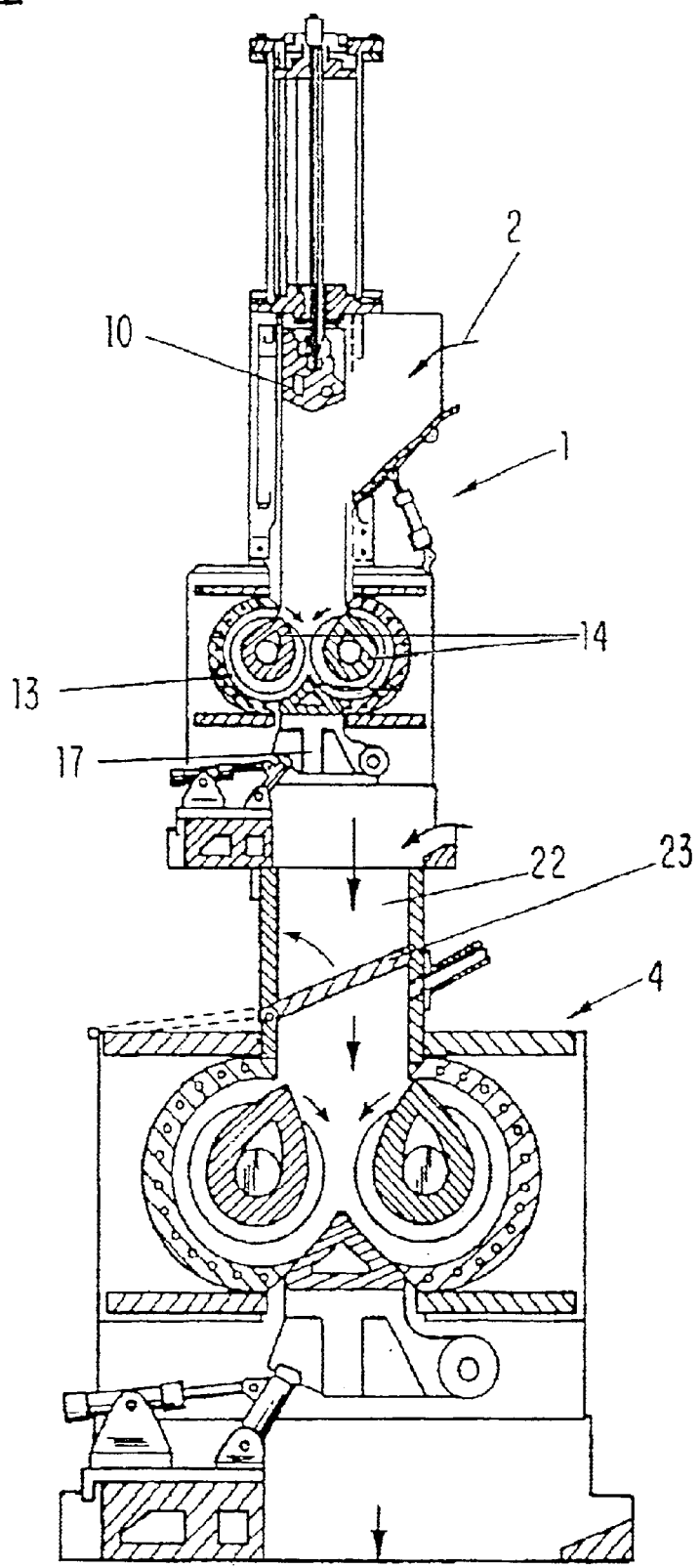

In the hereinafter following description of one embodiment of the invention, only the principal components of the apparatus for the production of rubber mixtures are described with attention being drawn to EP 0 472 931 A1, which is hereby incorporated by reference herein, for further details of this kneader-type apparatus.

The ram kneader 1 shown in the sole FIGURE of the drawings, which comprises an upwardly and downwardly moveable ram 10, also comprises a charge opening 2 via which the mixture components forming the master batch are introduced into the mixing chamber 13. Two rotors 14, which perform the actual mixing process following the lowering of the ram 10, are disposed in the mixing chamber 13.

Following the preparation of the base mixture, the mixing chamber 13 is opened via movement of a discharge flap 17 in the form of a saddle and the mixing components free fall along a channel-shaped intermediate space 22 into the second ram-less kneader 4. In connection with the transfer of the mixtures from the ram kneader 1 into the ram-less kneader 4, a flap 23 between the kneaders 1 and 4 is swung into its open position as shown in broken lines in the sole FIGURE of the drawings. In the ram-less kneader 4, the base mixture can be provided with further material including, in particular, reactive additives such as, for example, vulcanization chemicals.

In accordance with the present invention, in order to effect cooling of the base mixture in the ram-less kneader 4 with a fluid such as, for example, water, which can comprise reactive additives in emulsified or suspended form therein, the fluid is sprayed onto the mixture or onto the inner metal surfaces of the ram-less kneader 4. The introduction of the fluid can be effected by a spraying of the fluid with or without the deployment of injection nozzles. The injection nozzles, or, respectively, the fluid introduction arrangement via which the fluid is sprayed into the kneader 4, is positioned at the respective relevant location or locations or is, respectively, positioned as required and deployed.

It is also, however, possible to have already introduced fluid in the ram kneader 1, preferably shortly before or during the emptying or discharging process. In this event, the fluid is sprayed under pressure via injection nozzles into the kneader.

The injection spraying is effected in the ram kneader 1 and, in fact, immediately before the discharge flap 17 is opened and the mixture product is transferred over to the second ram-less kneader 4.

A wetting agent can be added to, respectively, the water which serves as the cooling medium or the emulsion or suspension, in order to achieve the greatest possible surface distribution on the surface coverings of the mixture product, or, respectively, on the inner metal surfaces of the ram-less kneader 4. Anions, cations, or non-ionic mediums can be used as the wetting agent. The portion of the wetting agent in the water comprises, in particular, between 0.01 and 5% and, preferably, between 0.2 and 1%. Moreover, it is of advantage if wetting agents are used which prevent or delay the formation of any lime deposits. It is to be understood, moreover, that it is advantageous if the sprayed-on and, in particular, linking wetting agent-containing, water is sprayed over the largest possible area of the surface coverings of the mixture product or the inner metal surfaces. In order to accelerate the cooling off process, it is, moreover, also advantageous if, immediately after the spraying on of the water, the evaporation is accelerated and the cooling off is accordingly improved via the introduction or passage of air over the mixture.

A further possibility exists to compartmentalize or section off by bulkheading the intermediate space between the discharge opening of the ram kneader and the charge opening of the ram-less kneader and to further accelerate the evaporation process of the water via creation of a vacuum and to liberate the mixture product from the remnants of water, the lower molecular portions of chemicals, and/or oligomeric polymerization chemicals.

The specification incorporates by reference the disclosure of German priority documents 102 31 524.8 filed Jul. 12, 2002 and 102 51 032.6 filed Nov. 2, 2002.

The present invention is, of course, in no way restricted to the specific disclosure of the specification and drawing, but also encompasses any modifications within the scope of the appended claims.

What is claimed is:

1. A method for the production of rubber mixtures in a ram kneader or in an aggregate combination of a ram kneader and a preferably thereunder disposed ram-less kneader, the process comprising:

applying a fluid in a surface covering application onto the mixture which has been handled in the ram kneader at the same time as during at least one of a time during the mixing process at which there occurs at least one of an enlargement of the working volume of a ram of the ram kneader, during the discharge process in which the mixture is discharged from the ram kneader, and during a time at which the mixture which has been transferred over to, and is in, the ram-less kneader, the boiling point of the fluid being less than the desired end temperature of the mixture and the fluid being evaporated during the course of further working of the mixture in a manner by which no fluid remnants remain.

2. A method according to claim 1, wherein the enlargement of the working volume of the ram kneader is effected via at least one of clearance movement of the ram, enlargement of the spacing of the axles of rotors of the ram kneader, and the opening of a discharge flap.

3. A method according to claim 1, wherein the fluid is introduced via at least one of injection and spraying.

4. A method according to claim 1, wherein the evaporation of the applied fluid is accelerated via an air stream, and in particular, via an air stream introduced by means of a fan or ventilator.

5. A method according to claim 1, wherein the boiling point of the applied fluid is lowered via evacuation below the desired end temperature of the mixture.

6. A method according to claim 5, wherein the evacuation is effected via compartmentalization or bulkheading of an intermediate space between the discharge opening of the ram kneader and the charge opening of the ram-less kneader.

7. A method according to claim 1, wherein the fluid is applied in the amount of 5 to 20 parts by weight of fluid per 100 parts by weight of the mixture.

8. A method according to claim 1, wherein the fluid is applied via a selected one of a single portion and multiple portions.

9. A method according to claim 1, wherein the fluid comprises reactive additives in emulsified or suspended form therein, which are added into the mixture.

10. A method according to claim 9, wherein the emulsions or suspensions are added into the mixture in the ram-less kneader.

11. A method according to claim 9, wherein the additives are emulsified or suspended in a fluid volume which comprises between 0.1 to 10% of the volume of the mixture.

12. A method according to claim 9, wherein the fluid is applied in the form of water.

13. A method according to claim 12, wherein the water contains at least one wetting agent.

14. A method according to claim 13, wherein the water has at least one of an anionic, cationic and non-ionic wetting added thereto.

15. A method according to claim 14, wherein the wetting agent added to the water has a concentration of between 0.01 to 5% by weight, and preferably, from 0.2 to 1% by weight.

16. A method according to claim 13, wherein the water has a wetting agent added thereto which prevents the formation of deposits of lime.

17. A method according to claim 1, wherein the fluid is applied in the form of ethanol.

18. A method for the production of a rubber mixture in an aggregate combination comprised of a ram kneader and a preferably thereunder arranged ram-less kneader, the process comprising:

applying fluid onto the inner metal surfaces of the ram-less kneader, with a selected one of an accompanying application of air, preferably dry air, onto such surfaces, and no accompanying application of air, such that the inner metal surfaces of the ram-less kneader are cooled before or during the transfer over of the mixing product from the ram kneader into the ram-less kneader, whereby the fluid evaporates during the course of further working of the mixture in a manner by which no fluid remnants remain.

* * * * *